March 10, 1959 W. D. KENNEY 2,876,852
CULTIVATING ATTACHMENT
Filed July 27, 1956 6 Sheets-Sheet 1
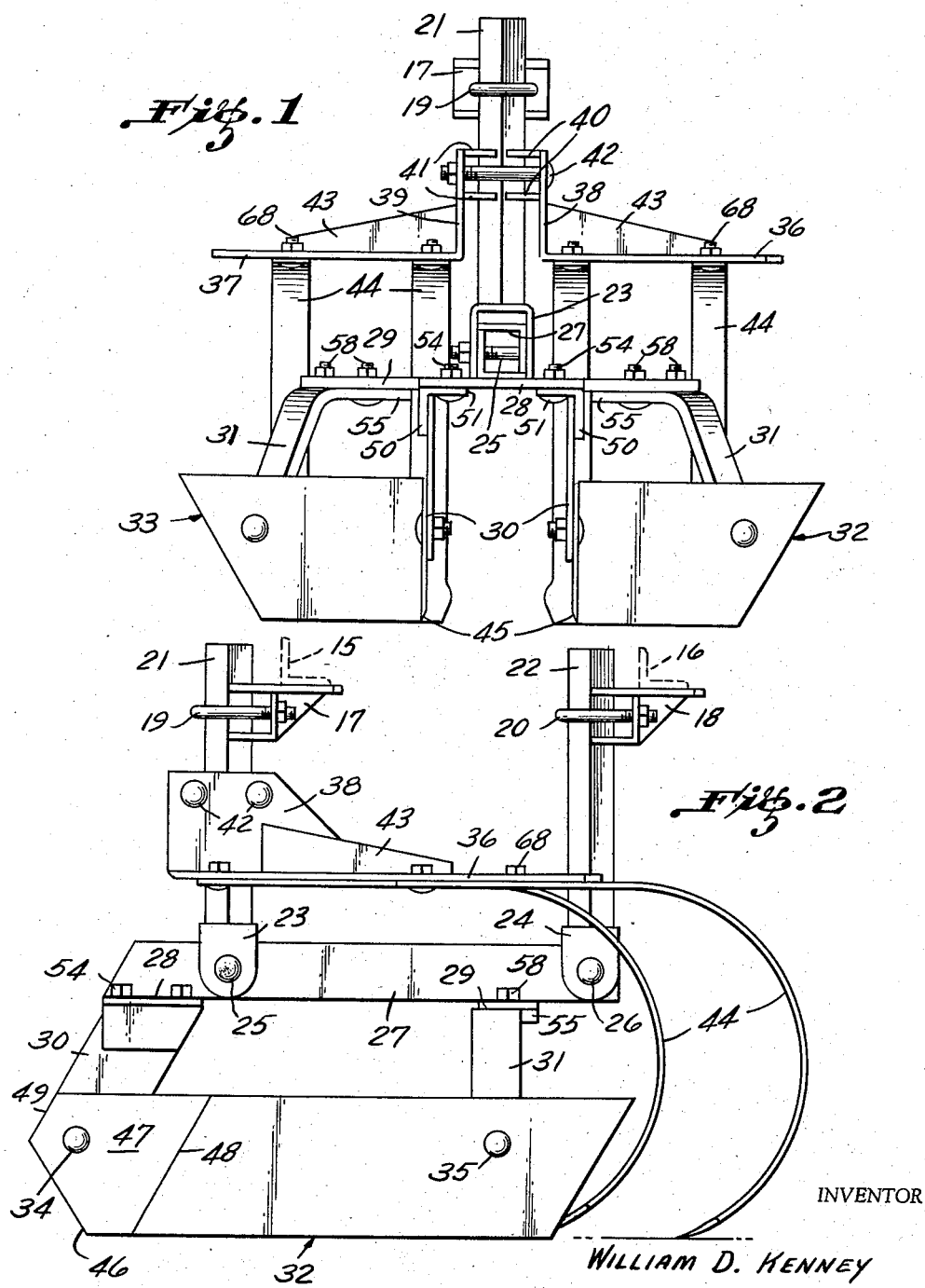
INVENTOR
WILLIAM D. KENNEY
BY
ATTORNEYS March 10, 1959  W. D. KENNEY  2,876,852
CULTIVATING ATTACHMENT
Filed July 27, 1956  6 Sheets-Sheet 2
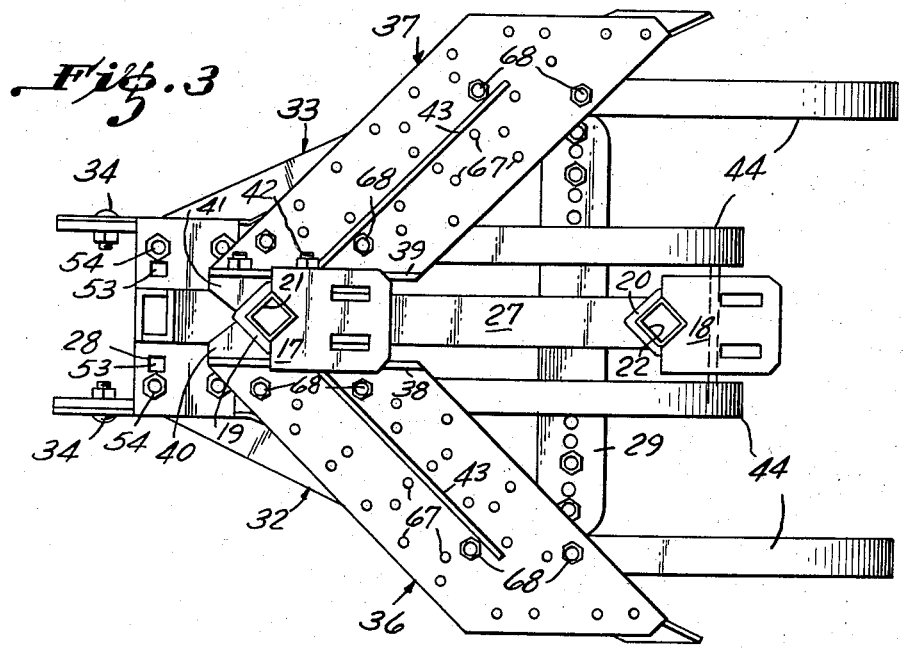
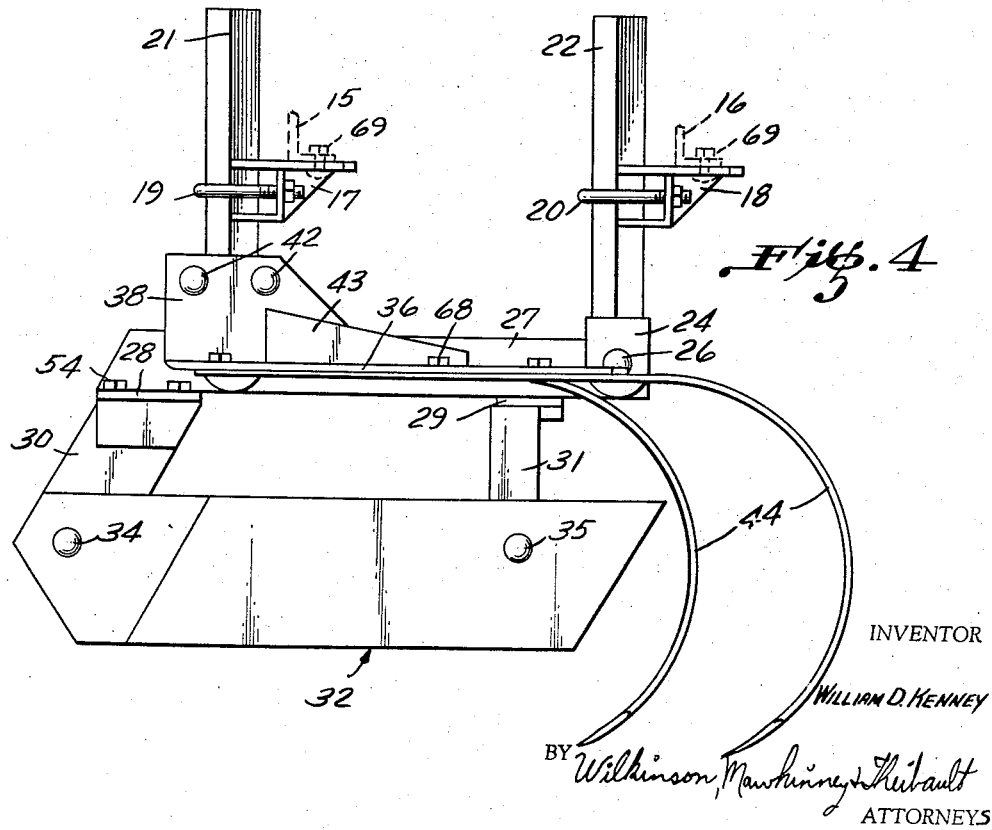
INVENTOR
WILLIAM D. KENNEY
BY Wilkinson, Mawhinney & Thibault
ATTORNEYS

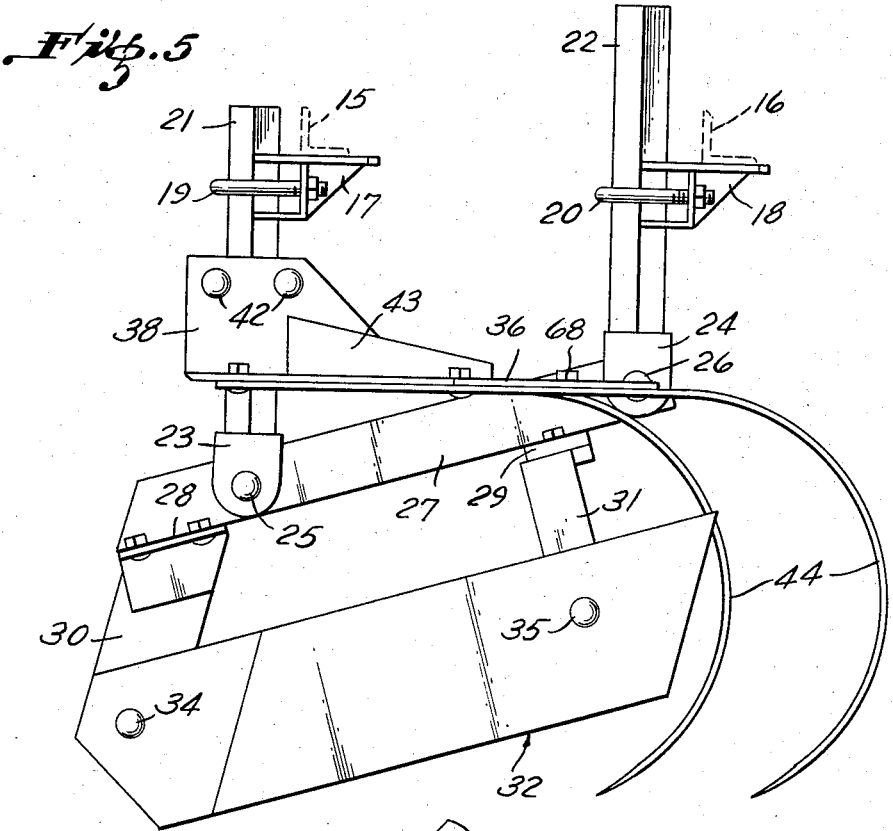
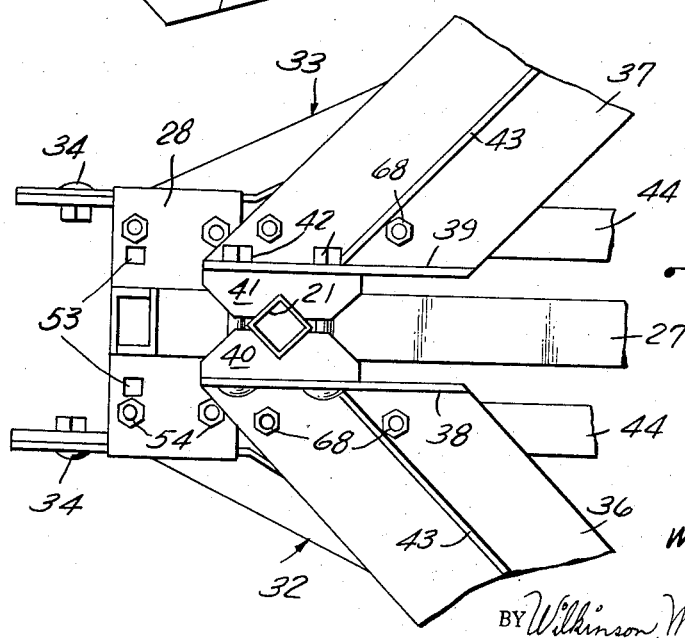

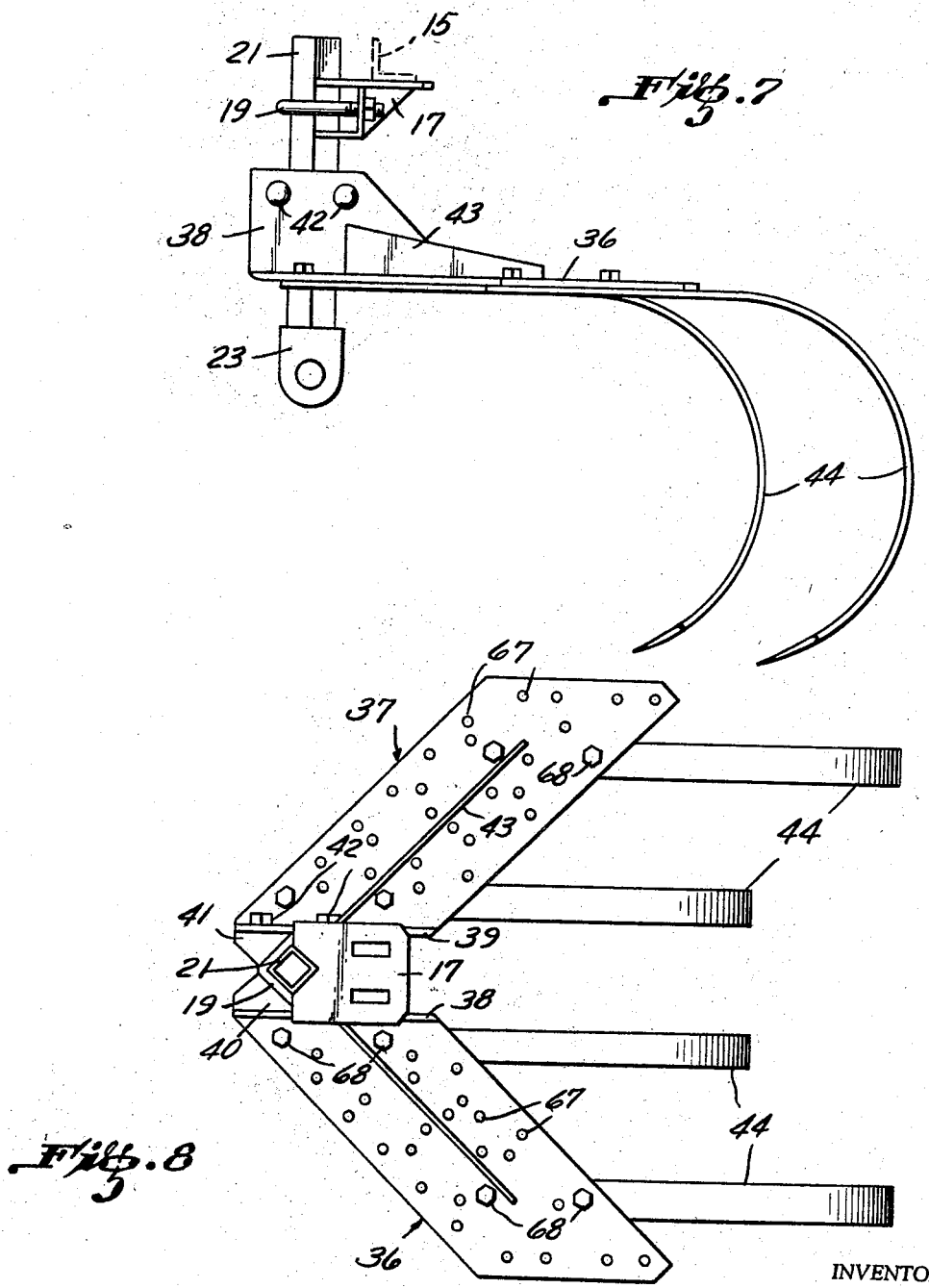

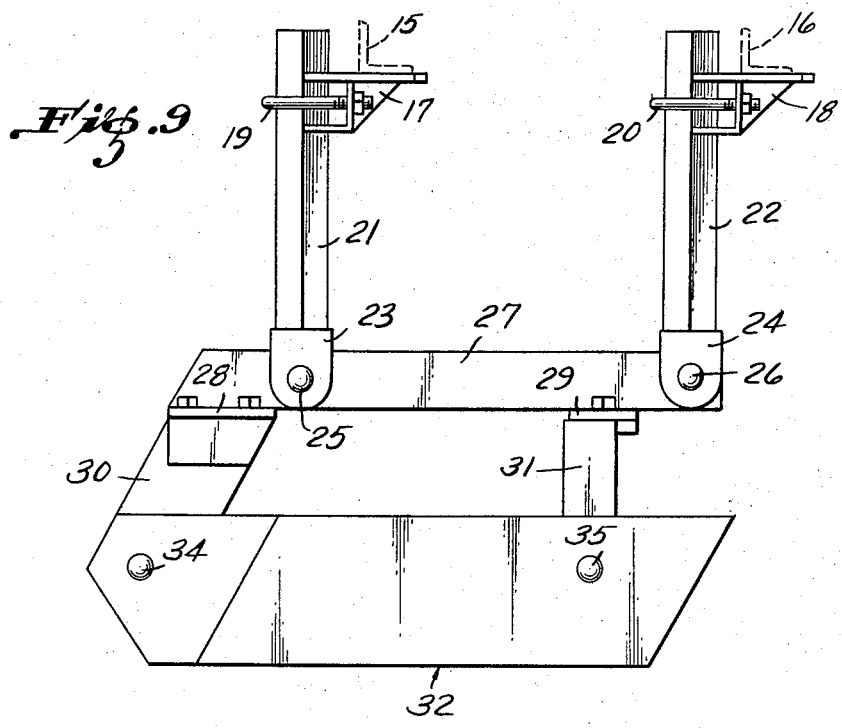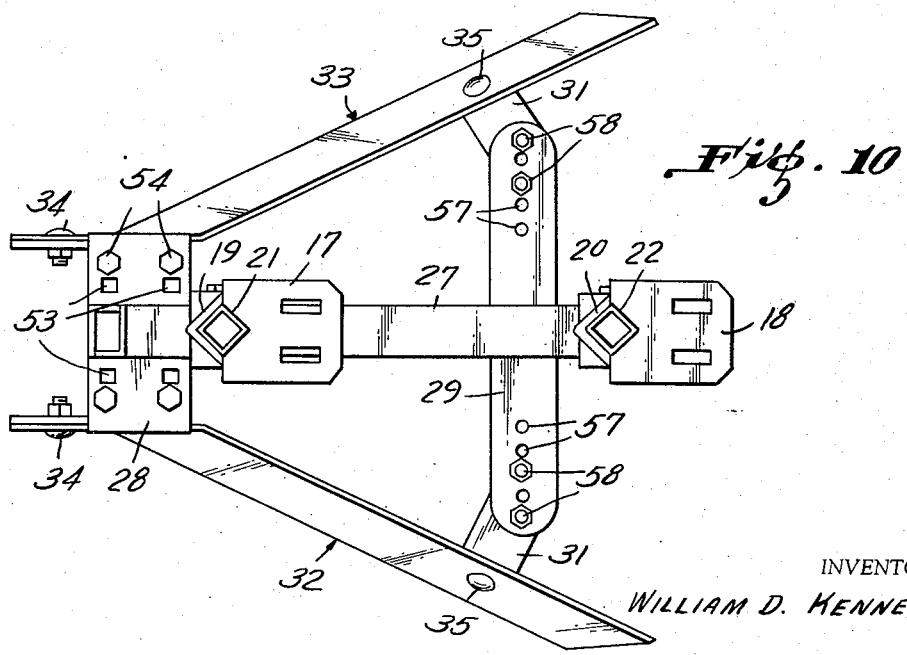

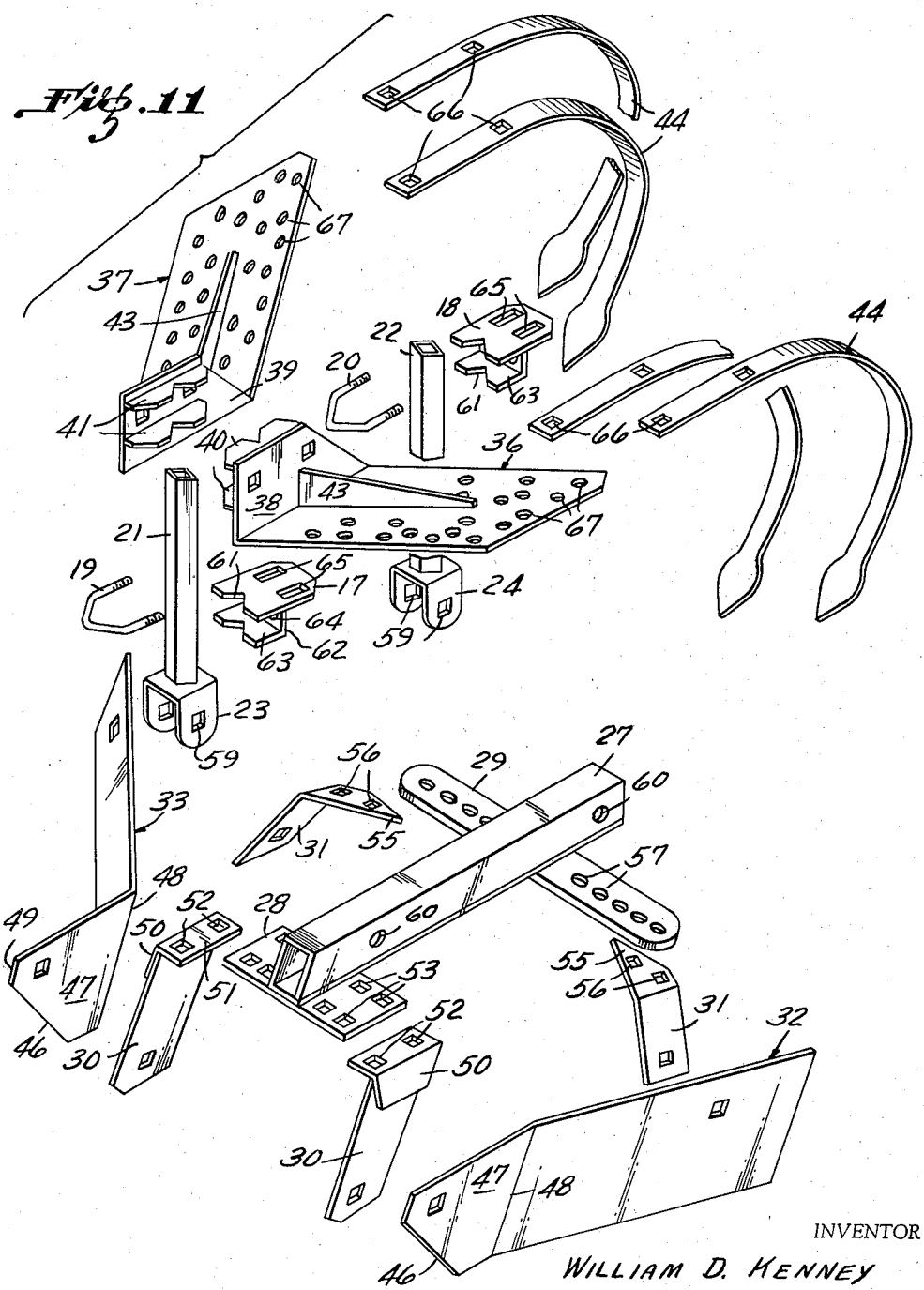

United States Patent Office 2,876,852
Patented Mar. 10, 1959

2,876,852

CULTIVATING ATTACHMENT

William D. Kenney, Columbus, Ga., assignor to Columbus Iron Works Company, Southern Plow Company Division, Columbus, Ga., a corporation of Georgia Application July 27, 1956, Serial No. 600,624

2 Claims. (Cl. 172—142)

The present invention relates to Cultivating Attachment and more particularly relates to a row crop cultivating attachment for tractor cultivating machines or the like.

The purpose of the invention is to improve row crop cultivation technique and efficiency by applying one or two units separately or combined with a system of simple adjustments that adapts the cultivator to a wide variety of conditions and uses.

Since the beginning of row crop production there have been continued efforts to improve cultivation methods by replacing slow, costly hand labor with mechanical application and by providing an ideal soil condition around the plant for optimum root development and plant growth.

Progress in cultivation has been made along many lines. One improvement was the development of a spring time unit that straddled the row and with one or more spring tines on each side of the row, arranged in echelon manner, mulched the top soil around the plant destroying small grass and weed plants and moving slight amounts of soil around the plants for root development. Another cultivating implement was developed and widely used. This implement also straddled the row but instead of spring tines on each side it had soil moving blades or sweeps that moved all trash, small weeds and grass with a section of top soil from each side of the row to the middle of the rows. This provided clean areas on each side of the row for further cultivating operations and the soil moved to the row centers was gradually worked back to the rows by succeeding cultivating operations.

The above two implements and methods were later combined into one implement and one operation. The combination was such that the sweep blade portion cleaned both sides of the row and moved the trash, weeds, and grass to the center of the row and was immediately followed by the spring time unit to loosen, mulch, and work the soil around the plants. This combination implement provides a pleasing cultivated condition when the two separate units are properly adjusted to each other and to the conditions of cultivation. These adjustments and the means of obtaining and keeping them have generally been unsatisfactory. The adjustments in many instances have been inadequate to get the desired initial setting as well as maintaining it through continued use and wear.

The invention accordingly has for an object to provide, in a cultivator attachment, numerous adjustments and combinations of various settings and with a novel form of support for the scratcher and scraper units which will enable the same to be separated or combined.

The invention has for a further object to provide an improved cultivator attachment combining scratcher and scraper units for separate or conjoint use in a relatively simple mechanical construction having a minimum number of parts and subject to quick and easy mounting and adjustment of the various parts and units.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a front elevational view of a cultivator attachment according to the present invention illustrating the complete assembly of both scraper and scratcher units.

Figure 2 is a side elevational view of the same taken from the left side of the attachment.

Figure 3 is a top plan view of the attachment with complete assembly.

Figure 4 is a side elevational view of the complete assembly also taken from the left side similar to Figure 2 but with the tines and supporting wings in a lowered position.

Figure 5 is also a left side elevational view illustrating the complete assembly but with the scraper blades in a tilted position.

Figure 6 is a top plan view, with parts broken away and with the top bracket removed illustrating the wing assembly and the wing clamps.

Figure 7 is a left side elevational view of the device with the scraper unit removed and illustrating only the scratcher unit.

Figure 8 is a top plan view of the same with the top bracket in place.

Figure 9 is also a side elevational view with the scratcher unit removed and illustrating only the scraper unit.

Figure 10 is a top plan view of the same with both top brackets in place.

Figure 11 is an exploded view of all of the parts of the attachment absent the nuts and bolts.

Referring more particularly to the drawings, 15 and 16 designate bottom members of tractor cultivator frame which members are shown in dotted lines in Figures 3, 4, 5, 7 and 9. Brackets 17 and 18 are adapted to be affixed adjustably to these members 15 and 16 and to adjustably support the cultivator attachment of this invention. The brackets 17, 18 are adjustably affixed, as by U-bolts 19, 20 to front and rear standards or posts 21 and 22 which are preferably hollow and square or rectangular in cross section.

The lower ends of the standards 21, 22 carry inverted U-shaped stirrups 23, 24 which straddle and are connected by pivot bolts 25, 26 to a longitudinal beam 27 which is also preferably hollow and square or rectangular in cross section. The beam 27 supports a front cross-piece 28 and a rear cross-bar 29 from which depend respectively the front and rear legs 30 and 31 to which are detachably affixed the sweep blades 32, 33 as by bolts 34, 35.

Wing plates 36, 37 are adjustably carried by the front standard 21, such wing plates having upstanding flanges 38, 39 from which project notched locating pieces 40, 41 adapted to be fitted to opposite sides of the standard 21 and to be affixed thereto as by bolts 42. If desired reinforcing webs 43 may extend between the flanges 38, 39 and the wing plates 36, 37. Spring tines 44 are adjustably carried by the wing plates 36, 37.

Referring more particularly to Figures 1, 2 and 11, the sweep blades 32, and 33 are beveled to bottom cutting edges 45, for which see particularly Figure 1. The leading edges of the blades are trimmed in a receding manner to facilitate shedding trash; or otherwise stated the leading edges at their lower portions 46 are downwardly and rearwardly declined, such leading edges being carried upon the front end portions 47 of the sweep blades. The front end portions 47 are bent flatwise such that when mounted the front ends 47 of right and left hand blades are parallel and in plane of direction of travel. Spaced a short distance from the leading edges of the blades, the same are bent outwardly as indicated 48 in an oblique manner. The upper portions 49 of the leading edges are also arranged at an inclination upwardly and rearwardly; or otherwise stated the upper portions of the leading edges 49 are arranged to lean backward from a vertical position causing the cutting edge to approach the soil from a cutting angle.

The front legs 30 are adjustable laterally on the front cross-piece 28 and the rear legs are adjustable likewise on the rear cross-bar 29. This may be accomplished for instance in the manner shown in Figure 11 in which the front legs 30 are welded or otherwise affixed to upright webs 50 of angle-irons having substantially horizontal webs 51 with bolt holes 52 therein adapted to be brought into registry with series of bolt holes 53 in the front cross-piece 28 through which bolts 54 (Figures 1 and 2) are adapted to pass.

In addition to the adjustment provided by moving the bolt holes 52 of the leg angle irons into registration with one or other set of the bolt openings 53 in the front cross-piece 28, it will be understood that the legs 30 may be reversed in position so that the horizontal webs 51 project outwardly or respectively away from one another which will bring the legs 30 closer together in any of the adjusted positions afforded by the series of bolt holes 53. Also a further adjustment may be had by locating the front parts 47 of the blades either inwardly or outwardly of the legs 30.

The rear legs 31 may also have angularly turned flanges 55 provided with bolt holes 56 adapted to register with any of a series of bolt holes 57 provided in the rear cross-piece 29. Detachable bolts 58, shown in Figures 1, 2 and 3 pass through the registering holes 56 and 57 for maintaining the adjustment.

The cross members 28 and 29 may be welded securely to the bottom side of the center beam 27 and the stirrups 23, 24 may be welded to the lower ends of the front and rear standards 21, 22 respectively. The bolts 25, 26 extend through bolt holes 59 in the stirrups 23, 24 and through bolt holes 60 in the beam 27, which holes are shown in Figure 11. This type of connection provides a swivel joint at the lower end of each standard 21, 22 to provide for movement through the parallelogram principle, for which see Figure 5.

Referring more particularly to Figure 11, the brackets 17, 18 preferably have V-notches 61 therein and depending webs 62 provided with notched flanges 63, the notches mating with and being adapted to be fitted to the upright posts or standards 21, 22 respectively. Bolt holes 64 are provided in the webs 62 to receive the ends of the U-shaped bolts 19, 20, the yoke portions of which are also V-shaped to fit upon the opposite sides of the standards 21, 22. The brackets 17, 18 are also provided with bolt slots 65 for adjustably attaching to the members 15, 16.

Bolt holes 66 in the shanks of the spring tines 44 are adapted to be matched with preselected of the numerous bolt holes 67 in the right and left wings 36, 37, bolts 68 being engaged through the registering holes to make fast the adjustment.

The mounting and adjustment may be effected as follows:

One or more unit assemblies according to Figures 1, 2 or 3 may be mounted to a standard tractor cultivator frame or tool bar by bolting the brackets 17, 18 to the cultivator frame 15, 16. The brackets 17, 18 may be located at any desired place or height along the standards 21, 22. Also the wing plates 36, 37 may be located at any desired place or elevation along the front standard 21 for proper penetration of the spring tines 44 with relation to the penetration of the cutting edges 45 of the scraper blades 32, 33 (compare Figures 2 and 4). The top or straight sections of the spring tines 44 remain parallel to the ground in all settings. The desired setting of the blades 32, 33 will ordinarily vary with changing conditions. The blades 32, 33 may be tilted longitudinally by loosening one or other of the U-bolts 19, 20 associated with the front or rear brackets 17, 18. Figure 5 shows a tilted adjustment of the blades 32, 33 in which the U-bolt 20 has been loosened so that the standard 22 may be shifted up or down relatively to the bracket 18 and its U-bolt 20. Incident to this operation it is also preferred to loosen the bolts which hold the bracket 18 to the cultivator frame member 16. In the instance shown in Figure 5, the rear standard 22 has been shifted upwardly through the bracket 18 and its U-bolt 20 so that the blades 32, 33 are given an inclined or diagonal position. After the desired setting the involved U-bolt 19, 20 is tightened and thereafter the bolts holding the involved brackets 17, 18 to the frame members 15, 16 are also tightened. In this way adjustments of the blades 32, 33 are independent of any adjustment of the tines 44.

By removing the two bolts 42, the spring tines 44 or scratcher unit is quickly removed and the "bar off" unit of the combination used as an individual unit which is often desirable. See in this connection Figures 9 and 10.

It is often desirable to use the scratcher unit separately from the scraper unit which may be done by removing the front bolt 25 and the two bolts holding the rear bracket 18 to the tractor frame. When this is accomplished the result is shown in Figures 7 and 8.

The above adjustments not only allow for initial settings and adjustments for given operations but also allow continued adjustment during a given operation that compensates for normal uneven wear between the blades and tines.

Although I have disclosed herein the best form of the invention known to me at this time, I reserve the right to all such modifications and changes as may come within the scope of the following claims.

What is claimed is:

1. In a cultivating attachment for use with a vehicle; spaced vertical standards mounted for vertical movement on the frame of said vehicle; a scraper assembly including a longitudinal beam mounted on the lower ends of said standards, said longitudinal beam being pivotally removable with respect to said standards upon vertical movement thereof, and spaced scraper blades operatively connected to said longitudinal beam and movable therewith upon vertical movement of said standards to adjust the angle of said scraper blades with respect to the ground; and a scratcher assembly including opposed plates operatively secured to one of said standards and movable with respect thereto, and a plurality of spaced tines secured to said plates, the ground penetration depth of said tines being adjustable upon vertical movement of said plates on the associated standard.

2. In a cultivating attachment for use with a vehicle as set forth in claim 1 which includes means for adjusting the horizontal position of said scraper blades with respect to said longitudinal beam, and means for adjusting the horizontal position of said tines with respect to said plates.

References Cited in the file of this patent

UNITED STATES PATENTS

| | | |
|---|---|---|
| 390,506 | Morton | Oct. 2, 1888 |
| 1,763,271 | Speck | June 10, 1930 |
| 2,560,631 | Burgess | July 17, 1951 |
| 2,707,909 | Ampe | May 10, 1955 |
| 2,733,646 | Sheffield | Feb. 7, 1956 |
| 2,758,531 | Siems | Aug. 14, 1956 |